United States Patent
Kamiya et al.

(10) Patent No.: US 12,312,439 B2
(45) Date of Patent: May 27, 2025

(54) POLYBUTYLENE TEREPHTHALATE RESIN COMPOSITION

(71) Applicant: TOYOBO CO., LTD., Osaka (JP)

(72) Inventors: Motonobu Kamiya, Otsu (JP); Yasuto Fujii, Osaka (JP); Takuya Shimoharai, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 794 days.

(21) Appl. No.: 17/429,753

(22) PCT Filed: Feb. 5, 2020

(86) PCT No.: PCT/JP2020/004322
§ 371 (c)(1),
(2) Date: Aug. 10, 2021

(87) PCT Pub. No.: WO2020/166444
PCT Pub. Date: Aug. 20, 2020

(65) Prior Publication Data
US 2022/0098362 A1  Mar. 31, 2022

(30) Foreign Application Priority Data
Feb. 12, 2019  (JP) ................. 2019-022661

(51) Int. Cl.
| C08G 63/183 | (2006.01) |
| C08K 5/29 | (2006.01) |
| C08L 23/26 | (2025.01) |
| C08L 67/02 | (2006.01) |

(52) U.S. Cl.
CPC .............. C08G 63/183 (2013.01); C08K 5/29 (2013.01); C08L 23/26 (2013.01); C08L 67/025 (2013.01); C08L 2205/03 (2013.01)

(58) Field of Classification Search
CPC ......... C08G 63/183; C08K 5/29; C08L 23/26; C08L 2205/03
See application file for complete search history.

(56) References Cited

U.S. PATENT DOCUMENTS

| 2012/0232200 A1 | 9/2012 | Ohtake et al. |
| 2018/0319976 A1 | 11/2018 | Yamada et al. |

FOREIGN PATENT DOCUMENTS

| CN | 102612540 | 7/2012 |
| CN | 108350255 | 7/2018 |
| EP | 0 593 254 | 4/1994 |
| JP | 6-122794 | 5/1994 |
| JP | 10-36645 | 2/1998 |
| JP | 10-95907 | 4/1998 |
| JP | 2011-207927 | 10/2011 |
| JP | 2012-201857 | 10/2012 |
| JP | 2016-108378 | 6/2016 |
| JP | 2016108378 A * | 6/2016 |
| JP | 2016-183294 | 10/2016 |
| JP | 2017-27906 | 2/2017 |
| JP | 2018-12209 | 1/2018 |
| WO | 2011/111547 | 9/2011 |
| WO | 2016/076135 | 5/2016 |

OTHER PUBLICATIONS

Nakagawa-JP2016108378A (Year: 2016).*
Office Action issued Sep. 19, 2022 in corresponding Chinese Patent Application No. 202080013597.7, with English language translation.
International Search Report (ISR) issued Mar. 24, 2020 in International (PCT) Application No. PCT/JP2020/004322.

* cited by examiner

Primary Examiner — Robert C Boyle
Assistant Examiner — Patrick Loen Benitez
(74) Attorney, Agent, or Firm — WENDEROTH, LIND & PONACK, L.L.P.

(57) ABSTRACT

The present invention relates to a polybutylene terephthalate resin composition comprising 70 to 97 parts by mass of a polybutylene terephthalate resin (A) having an intrinsic viscosity (IV) of 0.60 to 0.95 dl/g. 2 to 15 parts by mass of a modified olefin resin (B), and 1 to 15 parts by mass of a polyester elastomer (C), based on 100 parts by mass of components (A), (B) and (C) in total, and preferably further comprising 0.05 to 1.5 parts by mass of a carbodiimide compound (D). The polybutylene terephthalate resin composition has excellent impact properties and high fluidity.

3 Claims, No Drawings

POLYBUTYLENE TEREPHTHALATE RESIN COMPOSITION

TECHNICAL FIELD

The present invention relates to a polybutylene terephthalate resin composition. More specifically, the present invention provides a polybutylene terephthalate resin composition having excellent impact properties, high fluidity, and excellent in mold releasability in molding and t melt stability, and thus suitable for thin-wall molding.

BACKGROUND ART

Due to excellence in mechanical properties, electrical properties, other physical and chemical properties and due to good processability, polybutylene terephthalate resins have been used as an engineering plastic in a wide range of applications for automobiles, electric and electronic parts, etc. In particular, due to the excellent electrical properties, their applications for home appliances, office automation equipment, and automobiles, etc., have a tendency to increase. The growing tendency to make these products lighter, thinner, shorter and smaller is remarkable, and, for example, the outer shell parts thereof are extremely thin. A polybutylene terephthalate resin, however, has poor Charpy impact properties, resulting in a drawback that a thin-wall molding is particularly easily broken. In addition, a material having higher fluidity than conventional one is required.

A polybutylene terephthalate resin composition having excellent Charpy impact properties is, therefore, strongly required. As a method for improving the Charpy impact properties of a polybutylene terephthalate resin, addition of rubber is generally known.

In Patent Literature 1, enhancement of compatibility and improvement in impact resistance are performed by addition of a core-shell rubber having a glycidyl group to a polybutylene terephthalate resin. However, no attention is paid to fluidity, so that the fluidity is expected to be low.

In Patent Literature 2, it is shown that addition of an ethylene-alkyl acrylate-glycidyl methacrylate copolymer to a polybutylene terephthalate resin enables modification of the resin while maintaining a comparative tracking index. However, it is easily presumed that the fluidity decreases due to the reaction between the polybutylene terephthalate resin and a glycidyl group.

In Patent Literature 3, addition of a rubber and a core-shell elastomer to a polybutylene terephthalate resin improves impact resistance and enhances low warpage properties and weld strength. However, addition of a large amount of rubber and core-shell elastomer is required to improve the impact resistance, and so presumed to decrease the fluidity.

In Patent Literature 4, a core-shell polymer and glass fibers are used in combination in a polybutylene terephthalate resin to improve the impact resistance and rigidity. However, significant decrease in fluidity is expected due to increase in the flow resistance resulting from the combined use of glass fibers.

As shown in these literature, although various researches have been conducted on the improvement in impact properties, no studies for improvement in compatibility with high fluidity have been made. As a result, thin-wall molding of a material with improved impact properties has been difficult.

On the other hand, in Patent Literature 5, an attempt has been made to achieve compatibility between impact properties and high fluidity by blending an elastomer having a glycidyl group and/or a carboxylic acid derivative terminal and a chain polyester oligomer into a polybutylene terephthalate resin. However, since a chain polyester oligomer is easily gasified, there have been fundamental problems such as a cause of mold stains in injection molding and contamination of the internal part of a product.

CITATION LIST

Patent Literature

PTL 1: Japanese Patent Laying-Open No. 10-36645
PTL 2: Japanese Patent Laying-Open No. 2017-27906
PTL 3: Japanese Patent Laying-Open No. 2016-183294
PTL 4: Japanese Patent Laying-Open No. 10-95907
PTL 5: Japanese Patent Laying-Open No. 2012-201857

SUMMARY OF INVENTION

Technical Problem

The present invention is intended to solve the problems described above, and an object thereof is to provide a polybutylene terephthalate resin composition having excellent impact properties and high fluidity.

Solution to Problem

The present inventors have completed the present invention as a result of extensive studies on the constitution and properties of a polybutylene terephthalate resin composition in order to solve the problem described above.

In other words, the present invention has the following constitution.

[1] A polybutylene terephthalate resin composition comprising 70 to 97 parts by mass of a polybutylene terephthalate resin (A) having an intrinsic viscosity (IV) of 0.60 to 0.95 dl/g, 2 to 15 parts by mass of a modified olefin resin (B), and 1 to 15 parts by mass of a polyester elastomer (C), based on 100 parts by mass of components (A), (B) and (C) in total.

[2] The polybutylene terephthalate resin composition described in [1], wherein the polybutylene terephthalate resin composition has a flow length obtained by injection molding (measurement conditions: cylinder temperature at 250° C., mold temperature at 50° C., and injection pressure at 80 MPa) of 150 mm or more.

[3] The polybutylene terephthalate resin composition according to [1] or [2], wherein a molding obtained by injection molding of the polybutylene terephthalate resin composition has a Charpy impact strength of 4.5 KJ/m$^2$ or more.

[4] The polybutylene terephthalate resin composition according to any of [1] to [3], further comprising 0.05 to 1.5 parts by mass of a carbodiimide compound (D) based on 100 parts by mass of the components (A), (B) and (C) in total.

[5] The polybutylene terephthalate resin composition according to any of [1] to [4], wherein the modified olefin resin (B) is an ethylene copolymer obtained by copolymerization with maleic anhydride and/or glycidyl methacrylate in a total amount of 0.01 to 15 mass %.

Advantageous Effects of Invention

According to the present invention, compatibility between excellent Charpy impact strength and high fluidity is achieved even for a polybutylene terephthalate resin by addition of a modified olefin resin and a polyester elastomer at a specific compounding ratio.

DESCRIPTION OF EMBODIMENTS

The present invention is specifically described as follows.

Unless otherwise specified, the content (blending amount) of each component in a polybutylene terephthalate resin composition of the present invention is expressed as an amount relative to 100 parts by mass of a polybutylene terephthalate resin (A), a modified olefin resin (B), and a polyester elastomer (C) in total. In the present invention, the blending amount of each component directly represents the content in the polybutylene terephthalate resin composition.

[Polybutylene Terephthalate Resin (A)]

Polybutylene terephthalate resin (A) is a polymer that may be obtained by a conventional polymerization method such as polycondensation reaction between a dicarboxylic acid containing terephthalic acid or an ester-forming derivative thereof as a main component and a diol containing 1,4-butanediol or an ester-forming derivative thereof as a main component. Polybutylene terephthalate resin (A) has a repeating unit of butylene terephthalate in an amount of preferably 80 mol % or more, more preferably 90 mol % or more, still more preferably 95 mol % or more, particularly preferably 100 mol %.

Polybutylene terephthalate resin (A) may contain another polymer component within a range where the properties thereof are not impaired, for example, about 20 mol % or less. Examples of the polybutylene terephthalate resin containing another polymer component include polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate), and poly(butylene/ethylene) terephthalate. These components may be used alone or in combination of two or more.

The intrinsic viscosity (IV) of polybutylene terephthalate resin (A) needs to be 0.60 to 0.95 dl/g. With an intrinsic viscosity (IV) in the range, the fluidity, mechanical properties and chemical properties are improved. The intrinsic viscosity (IV) of polybutylene terephthalate resin (A) is preferably 0.65 to 0.90 dl/g, more preferably 0.68 to 0.88 dl/g, still more preferably 0.70 to 0.85 dl/g. With an intrinsic viscosity (IV) of less than 0.60 dl/g, the mechanical strength and impact properties may deteriorate in some cases. With an intrinsic viscosity (IV) of more than 0.95 dl/g, sufficient fluidity cannot be obtained, so that thin-wall molding tends to be difficult.

The amount of terminal carboxyl groups of polybutylene terephthalate resin (A) is not particularly limited. Hydrogen ions dissociated from the terminal carboxyl group play a catalytic role in the hydrolysis reaction of a polyester, so that the hydrolysis reaction is accelerated as the amount of the terminal carboxyl group increases. From this viewpoint, it is preferable that the amount of terminal carboxyl groups be small. On the other hand, however, reactive functional groups such as glycidyl groups of modified olefin resin (B) are reactive to the terminal carboxyl group of polybutylene terephthalate resin (A). As a result, with a too small amount of the terminal carboxyl group, the reaction with modified olefin resin (B) becomes insufficient to obtain sufficient impact properties in some cases.

The amount of terminal carboxyl groups of the polybutylene terephthalate resin (acid value) is preferably 40 eq/ton or less, more preferably 30 eq/ton or less, still more preferably 25 eq/ton or less. From the viewpoint of reactivity with glycidyl groups etc., the lower limit of the amount of terminal carboxyl groups (acid value) is 5 eq/ton.

The amount of terminal carboxyl groups of polybutylene terephthalate resin (A) (acid value) (unit: eq/ton) may be measured, for example, by dissolving a predetermined amount of polybutylene terephthalate resin in benzyl alcohol and performing titration using 0.01 mol/l benzyl alcohol solution of sodium hydroxide. As indicator, for example, a phenolphthalein solution may be used.

The content of polybutylene terephthalate resin (A) is 70 to 97 parts by mass. The content is preferably 75 to 96 parts by mass, more preferably 80 to 95 parts by mass. Blending polybutylene terephthalate resin (A) within the range enables to obtain a polybutylene terephthalate resin composition having high Charpy impact properties and fluidity.

[Modified Olefin Resin (B)]

Modified olefin resin (B) for use in the present invention is an olefin resin modified so as to have a functional group reactive to terminal groups (carboxyl group and hydroxyl group) of polybutylene terephthalate resin (A). An acid anhydride group and/or a glycidyl group are preferred as the reactive functional group. It is preferable that modified olefin resin (B) be an ethylene copolymer obtained by copolymerization with maleic anhydride and/or glycidyl methacrylate. The amount thereof in copolymerization is controlled to, preferably 0.01 to 15 mass %, more preferably 0.05 to 10 mass %, in total of maleic anhydride and/or glycidyl methacrylate in the ethylene copolymer. Modified olefin resin (B) may be produced by a known conventional method. The arrangement of copolymer components is not particularly limited, and, for example, any one of random copolymerization and graft copolymerization may be employed.

It is preferable that the glass transition temperature of modified olefin resin (B) be preferably −30° C. or less. Thereby, improvement in the impact resistance of the polybutylene terephthalate resin composition at −30° C. or less is also achieved.

Modified olefin resin (B) may be further copolymerized with a non-reactive component such as vinyl acetate and acrylate in addition to a reactive component such as maleic anhydride and/or glycidyl methacrylate, or may be copolymerized with one or two or more selected from these groups. The amount of these components copolymerized is not particularly limited, preferably 50 mass % or less, more preferably 40 mass % or less, based on 100 mass % of the modified olefin resin. With these components being copolymerized, the compatibility with polybutylene terephthalate resin (A) can be further enhanced.

As modified olefin resin (B) of the present invention, an unmodified olefin copolymer and a modified olefin copolymer may be used in combination. In that case, it is desirable that the glass transition temperature of at least one of the copolymers for use is −30° C. or less. Thereby, the impact resistance of the polybutylene terephthalate resin composition at −30° C. or less also can be improved. In the case of using an unmodified olefin copolymer and a modified olefin copolymer in combination, the total of both is presumed as the content of modified olefin resin (B), and the amount of maleic anhydride and/or glycidyl methacrylate copolymerized is presumed as the amount copolymerized based on the total mass of both.

Based on 100 mass % of the total of an unmodified olefin copolymer and a modified olefin copolymer, the amount of modified olefin copolymer blended is preferably 50 mass % or more, more preferably 70 mass %, still more preferably 80 mass % or more.

The content of modified olefin resin (B) is 2 to 15 parts by mass. The content is preferably 2 to 12 parts by mass, more preferably 3 to 10 parts by mass, still more preferably 3 to 9 parts by mass. Blending of modified olefin resin (B) within the range enables to obtain a polybutylene terephthalate resin composition having high Charpy impact properties, while maintaining original properties of a polybutylene terephthalate resin.

[Polyester Elastomer (C)]

It is preferable that polyester elastomer (C) for use in the present invention be a polyester elastomer having a hard segment formed of polyester including an aromatic dicarboxylic acid and an aliphatic and/or alicyclic glycol as constituents, and at least one soft segment selected from an aliphatic polyether, an aliphatic polyester and an aliphatic polycarbonate, with the hard segment being bonded to the soft segment.

In polyester elastomer (C) for use in the present invention, as the aromatic dicarboxylic acid constituting the hard segment polyester, typical aromatic dicarboxylic acids are widely used without particular limitation, and specific examples include terephthalic acid, isophthalic acid, orthophthalic acid, 2,6-naphthalenedicarboxylic acid, 1,5-naphthalenedicarboxylic acid, 1,2-bis(phenoxy) ethane-p,p'-dicarboxylic acid, 4,4'-biphenyldicarboxylic acid, and functional derivatives thereof. Among them, terephthalic acid, isophthalic acid, 2,6-naphthalenedicarboxylic acid, and 4,4'-biphenyldicarboxylic acid are preferred, which tend to have high crystallization rate and good moldability. In particular, terephthalic acid and terephthalic acid dimethyl ester, isophthalic acid and isophthalic acid dimethyl ester, and 2,6-naphthalenedicarboxylic acid and 2,6-naphthalenedicarboxylic acid dimethyl ester are preferred. Further, aliphatic dicarboxylic acids such as adipic acid, sebacic acid, succinic acid, glutaric acid and dimer acid and functional derivatives thereof, and alicyclic dicarboxylic acids such as hexahydroterephthalic acid, hexahydroisophthalic acid and cyclohexanedicarboxylic acid and functional derivatives thereof may be used in an amount of less than 50 mol % in the dicarboxylic acid components constituting the hard segment polyester. The content of components other than aromatic dicarboxylic acids is preferably less than 50 mol %, more preferably less than 40 mol %, still more preferably less than 30 mol %. With a content of components other than aromatic dicarboxylic acids of 50 mol % or more, the crystallinity of the polyester elastomer tends to decrease, and the moldability and heat resistance tend to decrease.

Further, in polyester elastomer (C) for use in the present invention, as the aliphatic or alicyclic glycol constituting the hard segment polyester, typical aliphatic or alicyclic glycols are widely used without particular limitation, and alkylene glycols having 2 to 8 carbon atoms are primarily desirable. Ethylene glycol, 1,3-propylene glycol, 1,4-butanediol, 1,6-hexanediol and 1,4-cyclohexanedimethanol are preferred, and any of ethylene glycol and 1,4-butanediol is particularly preferred.

As a component constituting the hard segment polyester described above, one having an ethylene terephthalate unit (unit composed of terephthalic acid and ethylene glycol) or a butylene terephthalate unit (unit composed of terephthalic acid and 1,4-butanediol) is more preferred from the viewpoints of physical properties, moldability and cost performance.

Further, in the case where an aromatic polyester suitable as a polyester constituting a hard segment in polyester elastomer (C) for use in the present invention is produced in advance and then copolymerized with a soft segment component, the aromatic polyester can be easily obtained according to a typical production method. It is preferable that such a polyester have a number average molecular weight of 10000 to 40000.

The soft segment of polyester elastomer (C) for use in the present invention is at least one selected from an aliphatic polyether, an aliphatic polyester, and an aliphatic polycarbonate. Examples of the aliphatic polyether include polyoxyethylene glycol, polyoxypropylene glycol, polyoxytetramethylene glycol, polyoxyhexamethylene glycol, polyoxytrimethylene glycol, a copolymer of ethylene oxide and propylene oxide, ethylene oxide adduct of polyoxypropylene glycol, and a copolymer of ethylene oxide and tetrahydrofuran.

Examples of the aliphatic polyester include poly(ε-caprolactone), polyenantholactone, polycaprylolactone, and polybutylene adipate.

Further, it is preferable that the aliphatic polycarbonate be mainly formed of an aliphatic diol residue having 2 to 12 carbon atoms. Examples of the aliphatic diol include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. In particular, from the viewpoints of flexibility and low temperature properties of resulting polyester elastomer (C), an aliphatic diol having 5 to 12 carbon atoms is preferred. Based on the cases described below, these components may be used alone or in combination of two or more on an as needed basis.

In the present invention, an aliphatic polycarbonate diol constituting the usable soft segment of polyester elastomer (C), which has excellent low-temperature properties, has preferably a low melting point (for example, 70° C. or less) and a low glass transition temperature. Generally, an aliphatic polycarbonate diol made of 1,6-hexanediol that is used for forming the soft segment of a polyester elastomer has a low glass transition temperature of about −60° C.' and a melting point of about 50° C., so that excellent low-temperature properties are obtained. In addition, an aliphatic polycarbonate diol obtained by copolymerizing the aliphatic polycarbonate diol with, for example, 3-methyl-1,5-pentanediol in an appropriate amount corresponds to an aliphatic polycarbonate diol having excellent low-temperature properties, with a lowered or amorphous melting point, even though having a slightly higher glass transition point in comparison with the original aliphatic polycarbonate diol. Also, for example, an aliphatic polycarbonate diol made of 1,9-nonanediol and 2-methyl-1,8-octanediol corresponds to an aliphatic polycarbonate diol having excellent low-temperature properties, with a melting point of about 30° C. and a glass transition temperature of about −70° C., which are sufficiently low.

It is preferable that polyester elastomer (C) for use in the present invention be a copolymer containing terephthalic acid, 1,4-butanediol, and polyoxytetramethylene glycol as main components due to economy, heat resistance, and cold resistance requirements. In the dicarboxylic acid components constituting polyester elastomer (C), the terephthalic acid content is preferably 40 mol % or more, more preferably 70 mol % or more, still more preferably 80 mol % or more, particularly preferably 90 mol % or more. In the glycol components constituting polyester elastomer (C), the total content of 1,4-butanediol and polyoxytetramethylene glycol is preferably 40 mol % or more, more preferably 70 mol % or more, still more preferably 80 mol % or more, particularly preferably 90 mol % or more.

It is preferable that the number average molecular weight of the polyoxytetramethylene glycol be 500 to 4000. With a number average molecular weight of less than 500, the elastomer properties may be difficult to develop in some cases. On the other hand, with a number average molecular weight of more than 4000, compatibility with a polyester portion constituting the hard segment of polyester elastomer (C) decreases, so that copolymerization in a block form may become difficult in some cases. The number average molecular weight of polyoxytetramethylene glycol is more preferably 800 or more and 3000 or less, still more preferably 1000 or more and 2500 or less.

Regarding the amount of the hard segment and the soft segment of polyester elastomer (C) copolymerized for use in the present invention, the mass ratio of hard segment/soft segment is preferably 85/15 to 35/65, more preferably 75/25 to 50/50.

The hardness (surface hardness) of polyester elastomer (C) for use in the present invention is not particularly limited, and a polyester elastomer having a Shore hardness in a wide range from low hardness to high hardness, i.e., a Shore D hardness of about 25 to about 75, can be used. One having a Shore D hardness of 30 to 65 is preferred, and one having a Shore D hardness of 35 to 60 is more preferred.

It is preferable that the reduced viscosity of polyester elastomer (C) for use in the present invention be 0.5 dl/g or more and 3.5 dl/g or less in the following measurement method. With a reduced viscosity of less than 0.5 dl/g, durability as a resin is low, and with a reduced viscosity of more than 3.5 dl/g, moldability may be insufficient in some cases. The reduced viscosity of polyester elastomer (C) is more preferably 1.0 dl/g or more and 3.0 dl/g or less, still more preferably 1.3 dl/g or more and 2.8 dl/g or less. Further, the acid value is preferably 200 eq/t or less, more preferably 60 eq/t or less.

Polyester elastomer (C) for use in the present invention can be manufactured by a known method. For example, any of the following methods may be employed: a method of performing transesterification reaction of a lower alcohol diester of dicarboxylic acid, an excess amount of a low molecular weight glycol, and a soft segment component in the presence of a catalyst to polycondensate the resulting reaction products; a method of performing esterification reaction of a dicarboxylic acid, an excess amount of a glycol, and a soft segment component in the presence of a catalyst to polycondensate the resulting reaction products; a method of adding soft segment components to hard segments prepared in advance to cause randomization through transesterification reaction; a method of connecting a hard segment to a soft segment with a chain linking agent; and a method of performing an addition reaction of ε-caprolactone monomer to the hard segment in the case of using poly(ε-caprolactone) as soft segment.

The content of polyester elastomer (C) is 1 to 15 parts by mass, preferably 2 to 14 parts by mass, and more preferably 3 to 13 parts by mass. Blending of polyester elastomer (C) in the range enables to obtain a polybutylene terephthalate resin composition having high fluidity without impairment of impact properties.

[Carbodiimide Compound (D)]

Carbodiimide compound (D) in the present invention is not particularly limited as long as it is a compound having a carbodiimide group (—N=C=N—) in the molecule. In carbodiimide compound (D) for use in the present invention, the group bonded to the carbodiimide group is not particularly limited, and examples thereof include an aliphatic group, an alicyclic group, an aromatic group, and a group to which these organic groups are bonded (e.g., a benzyl group, a phenethyl group, a 1,4-xylylene group, etc.). Examples of the carbodiimide compounds suitably used in the present invention include an aliphatic carbodiimide compound having an aliphatic group linked to a carbodiimide group, an alicyclic carbodiimide compound having an alicyclic group linked to a carbodiimide group, and an aromatic carbodiimide compound having an aromatic group or an aromatic group-containing group linked to a carbodiimide group. Carbodiimide compound (D) may be used alone or in combination of two or more.

Specific examples of the aliphatic carbodiimide compound include diisopropylcarbodiimide and dioctyldecylcarbodiimide, and specific examples of the alicyclic carbodiimide compound include dicyclohexylcarbodiimide and poly (4,4'-dicyclohexylmethanecarbodiimide).

Specific examples of the aromatic carbodiimide compound include a mono- or dicarbodiimide compound such as diphenylcarbodiimide, di-2,6-dimethylphenylcarbodiimide, N-tolyl-N'-phenylcarbodiimide, di-p-nitrophenylcarbodiimide, di-p-aminophenylcarbodiimide, di-p-hydroxyphenylcarbodiimide, di-p-chlorophenylcarbodiimide, di-p-methoxyphenylcarbodiimide, di-3,4-dichlorophenylcarbodiimide, di-2,5-chlorophenylcarbodiimide, di-o-chlorophenylcarbodiimide, p-phenylene-bis-di-o-tolylcarbodiimide, p-phenylene-bis-dicyclohexylcarbodiimide, p-phenylene-bis-dichlorophenylcarbodiimide, and ethylene-bis-diphenylcarbodiimide, and a polycarbodiimide compound such as poly(4,4'-diphenylmethanecarbodiimide), poly(3,5'-dimethyl-4,4'-diphenylmethanecarbodiimide), poly(p-phenylenecarbodiimide), poly(m-phenylenecarbodiimide), poly(naphthylenecarbodiimide), poly(1,3-diisopropylphenylenecarbodiimide), poly(1-methyl-3,5-diisopropylphenylenecarbodiimide), poly(1,3,5-triethylphenylenecarbodiimide), and poly(triisopropylphenylenecarbodiimide).

It is preferable that carbodiimide compound (D) be a polycarbodiimide compound. Use of the polycarbodiimide compound tends to improve residence stability during melting. The molecular weight of the polycarbodiimide compound is preferably 2000 or more.

In the present invention, although carbodiimide compound (D) is not an essential component, in the case where it is contained, the content (blending amount) thereof is not particularly limited as long as the object of the present invention is not impaired. The range in which the fluidity of the polybutylene terephthalate resin composition is not impaired is preferably 0.05 to 1.5 parts by mass, more preferably 0.1 to 1.2 parts by mass. Carbodiimide compound (D) is considered to play a role as compatibilizing agent for polybutylene terephthalate resin (A) and polyester elastomer (C) through reactions with them, and a role of improving hydrolysis resistance and decreasing gas generation during molding. With an amount of less than 0.05 parts by mass, it is difficult to obtain desired properties, while with an amount of more than 1.5 parts by mass, the viscosity tends to increase at the same time as the reaction with the terminals of (A) and (C), so that the fluidity may be reduced. Further, with a content of carbodiimide compound (D) made of polycarbodiimide compound in the range of 0.05 to 1.5 parts by mass, a compatibilization effect of polybutylene terephthalate resin (A) and polyester elastomer (C) and an appropriate thickening effect are obtained, so that improvement in impact strength of the polybutylene terephthalate resin composition can be expected.

[Other Additives]

The polybutylene terephthalate resin composition of the present invention may contain various known additives on an as needed basis, within a range where properties in the present invention are not impaired. Examples of the known additives include a colorant such as a pigment, a mold release agent, a heat resistance stabilizer, an antioxidant, an ultraviolet absorber, a light stabilizer, a plasticizer, a modifier, an antistatic agent, a flame retardant, and a dye.

Examples of the release agent include a long-chain fatty acid or an ester thereof and a metal salt thereof, an amide compound, a polyethylene wax, silicone, and polyethylene oxide. As the long-chain fatty acid, ones having 12 or more carbon atoms are particularly preferred, and examples thereof include stearic acid, 12-hydroxystearic acid, behenic acid, and montanic acid. A part or the whole of carboxylic acid may be esterified with monoglycol or polyglycol, or may form a metal salt. Examples of the amide compound include ethylene bis-terephthalamide and methylene bis-stearylamide. These mold release agents may be used alone or as a mixture.

These various additives may be contained in a total amount of up to 5 parts by mass, based on 100 parts by mass of (A), (B) and (C) in total described above. In the polybutylene terephthalate resin composition, it is preferable that the total amount of essential components (A), (B) and (C) be 95 mass % or more.

[Polybutylene Terephthalate Resin Composition]

A production method for producing the polybutylene terephthalate resin composition of the present invention includes blending the composition in an optional blending sequence, and then mixing the composition with a tumbler or a Henschel mixer for melt-kneading. The melt-kneading method may be any method well known to those skilled in the art with use of a single-screw extruder, a twin-screw extruder, a kneader, a Banbury mixer, a roll, or the like. In particular, use of a twin-screw extruder is preferred. Further, in order to remove a volatile component or a low-molecular component generated through decomposition of the resin during processing, it is desirable to perform suction from a vent port near a die head at the end of extruder by a vacuum pump.

It is preferable that the flow length obtained by injection molding of the polybutylene terephthalate resin composition of the present invention (measurement conditions: cylinder temperature at 250° C., mold temperature at 50° C., injection pressure at 80 MPa) be 150 mm or more. The flow length is measured by using a flow length evaluation mold with a flow channel having a width of 10 mm and a thickness of 1 mm on an injection molding machine, and detailed conditions are as described in Examples. The polybutylene terephthalate resin composition obtained by the blending described above enables to have a flow length of 150 mm or more. It is more preferable that the flow length be 155 mm or more.

It is preferable that the Charpy impact strength of a molding obtained by injection molding of the polybutylene terephthalate resin composition of the present invention be 4.5 KJ/m² or more. The Charpy impact strength is measured in accordance with ISO-179, and the detailed conditions are as described in Examples. The polybutylene terephthalate resin composition obtained by the blending described above enables to obtain a Charpy impact strength of 4.5 KJ/m² or more.

EXAMPLES

The present invention will be specifically described with reference to Examples and Comparative Examples, though the present invention is not limited thereto. Incidentally, the measured values described in Examples were measured by the following methods.

(1) Intrinsic Viscosity of Polybutylene Terephthalate Resin

In 25 ml of a mixed solvent of phenol/tetrachloroethane (mass ratio: 6/4), 0.1 g of a sample was dissolved and measured at 30° C. using an Ubbelohde viscosity tube. (Unit: dl/g)

(2) Reduced Viscosity of Polyester Elastomer

In 25 ml of a mixed solvent (phenol/tetrachloroethane=60/40 (mass ratio)), 0.05 g of a sample was dissolved and measured at 30° C. using an Ostwald viscometer. (Unit: dl/g)

(3) Acid Value of Polybutylene Terephthalate Resin and Polyester Elastomer

In 25 ml of benzyl alcohol, 0.5 g of polybutylene terephthalate resin (polyester elastomer) was dissolved and titrated using 0.01 mol/l benzyl alcohol solution of sodium hydroxide for the measurement. A phenolphthalein solution was used as indicator. (Unit: eq/ton)

(4) Hardness (Surface Hardness) of Polyester Elastomer

Measurement was performed in accordance with JIS K7215 (-1986). As the test piece, a stack of three injection-molded products (length: 100 mm, width: 100 mm, thickness: 2 mm) prepared at a cylinder temperature of 240° C. and a mold temperature of 50° C. was used for the measurement at a measurement pressure of 5000 g, using a durometer with a type-D indenter. The value at 5 seconds after the start of measurement was defined as the D hardness (Shore D hardness).

(5) Flow Length of Polybutylene Terephthalate Resin Composition

Using an injection molding machine (EC-100) manufactured by Shibaura Machine Co., Ltd., with a mold for flow length evaluation having a flow channel with a width of 10 mm and a thickness of 1 mm, at an injection pressure of 80 MPa, a cylinder temperature of 250° C., and a mold temperature of 50° C., 20 shots of injection molding were continuously performed at an injection rate of 40 mm/s, an injection time of 5 s, a cooling time of 12 s, and a molding cycle of 20 s; and the flow length at the 20th shot was measured.

(6) Bending Strength and Bending Modulus

The measurement was performed in accordance with ISO-178. The test piece was injection molded under the conditions at a cylinder temperature of 250° C. and a mold temperature of 50° C.

(7) Charpy Impact Strength

The measurement was performed in accordance with ISO-179 at 23° C., using a Charpy impact tester (DG-CB manufactured by Toyo Seiki Seisaku-sho, Ltd.) (weighing: 4.0 J, hammer lifting angle: 150°. An ISO dumbbell test piece (thickness: 4 mm) was injection molded under conditions at a cylinder temperature of 250° C. and a mold temperature of 50° C., and then cut and notched with a notching tool (A-4 manufactured by Toyo Seiki Seisaku-sho, Ltd.) to make a test piece.

The blended components that were used in Examples and Comparative Examples are shown below.

Polybutylene Terephthalate Resin (A)

Polybutylene terephthalate resin (A-1): intrinsic viscosity: 0.80 dl/g, acid value: 15 eq/ton Polybutylene terephthalate resin (A-2): intrinsic viscosity: 0.75 dl/g, acid value: 12 eq/ton Polybutylene terephthalate resin (A-3): intrinsic viscosity 1.05 dl/g, acid value: 17 eq/ton Modified Olefin Resin (B)

(B-1): Bond First 7M (ethylene/methyl acrylate/glycidyl methacrylate copolymer manufactured by Sumitomo Chemical Co., Ltd., glass transition temperature: −33° C., glycidyl methacrylate content: 6 mass %)

(B-2): Bondine AX-8390 (ethylene/ethyl acrylate/maleic anhydride copolymer manufactured by Arkema S. A., glass transition temperature: −35° C., maleic anhydride content: 1.3 mass %)

Polyester Elastomer (C)

Polyester elastomer (C-1) of terephthalic acid (TPA)//1, 4-butanediol (BD)/polyoxytetramethylene glycol (PTMG; number average molecular weight: 1000)=100//93/7 (mol %), (mass ratio of hard segment/soft segment=75/25): melting point: 210° C., reduced viscosity: 1.5 dl/g, acid value: 50 eq/ton Polyester elastomer (C-2) of terephthalic acid (TPA)//1, 4-butanediol (BD)/polyoxytetramethylene glycol (PTMG; number average molecular weight: 1000)=100/84/16 (mol %), (mass ratio of hard segment/soft segment=57/43): melting point: 198° C., reduced viscosity: 1.9 dl/g, acid value: 35 eq/ton Carbodiimide Compound (D)

(D-1): Carbodilite LA-1 (alicyclic carbodiimide manufactured by Nisshinbo Chemical Inc.)

(D-2): Stabaxol P (aromatic carbodiimide manufactured by Rhein Chemie)

Other Additives

Antioxidant: Irganox 1010 (manufactured by BASF)

Release agent: Licolub WE40 (manufactured by Clariant Japan K. K.)

Examples 1 to 12, Comparative Examples 1 to 9

Blending was performed as shown in Table 1. Melt-kneading was performed by a co-rotating twin-screw extruder with a cylinder set at a temperature of 250° C. The resulting strand was water-cooled and pelletized. The resulting pellets were dried at 130° C. for 4 hours for use in each of the evaluation tests described above. The results are shown in Table 1.

TABLE 1

| | | (A-1) Parts by mass | (A-2) Parts by mass | (A-3) Parts by mass | (B-1) Parts by mass | (B-2) Parts by mass | (C-1) Parts by mass | (C-2) Parts by mass | (D-1) Parts by mass | (D-2) Parts by mass |
|---|---|---|---|---|---|---|---|---|---|---|
| Example | 1 | 92 | | | 4 | | 4 | | | |
| | 2 | 92 | | | 4 | | 4 | | 0.3 | |
| | 3 | 88 | | | 4 | | 8 | | 0.3 | |
| | 4 | 84 | | | 4 | | 12 | | 0.3 | |
| | 5 | 88 | | | 8 | | 4 | | 0.3 | |
| | 6 | 86 | | | 10 | | 4 | | 0.3 | |
| | 7 | 88 | | | | 4 | 8 | | 0.3 | |
| | 8 | 88 | | | 4 | | | 8 | 0.3 | |
| | 9 | | 88 | | 4 | | 8 | | 0.3 | |
| | 10 | 88 | | | 4 | | 8 | | 1.0 | |
| | 11 | 88 | | | 4 | | 8 | | 1.5 | |
| | 12 | 88 | | | 4 | | 8 | | | 0.3 |
| Comparative Example | 1 | 100 | | | | | | | | |
| | 2 | 100 | | | | | | | 0.3 | |
| | 3 | | | 92 | 4 | | 4 | | 0.3 | |
| | 4 | 96 | | | 4 | | | | 0.3 | |
| | 5 | 92 | | | 8 | | | | 0.3 | |
| | 6 | 90 | | | 10 | | | | 0.3 | |
| | 7 | 96 | | | | | 4 | | 0.3 | |
| | 8 | 92 | | | | | 8 | | 0.3 | |
| | 9 | 88 | | | | | 12 | | 0.3 | |

| | | Composition | | Physical properties | | | |
|---|---|---|---|---|---|---|---|
| | | Antioxidant Parts by mass | Mold release agent Parts by mass | Bending strength MPa | Bending modulus GPa | Charpy impact strength kJ/m$^2$ | Flow length (80 MPa) mm |
| Example | 1 | 0.2 | 0.5 | 76 | 2.2 | 5.8 | 172 |
| | 2 | 0.2 | 0.5 | 78 | 2.2 | 6.0 | 163 |
| | 3 | 0.2 | 0.5 | 72 | 2.0 | 6.2 | 191 |
| | 4 | 0.2 | 0.5 | 69 | 1.9 | 6.4 | 203 |
| | 5 | 0.2 | 0.5 | 62 | 1.8 | 9.3 | 156 |
| | 6 | 0.2 | 0.5 | 59 | 1.7 | 11.1 | 151 |
| | 7 | 0.2 | 0.5 | 68 | 2.0 | 4.9 | 184 |
| | 8 | 0.2 | 0.5 | 55 | 1.6 | 5.8 | 173 |
| | 9 | 0.2 | 0.5 | 68 | 2.0 | 5.5 | 198 |
| | 10 | 0.2 | 0.5 | 72 | 1.9 | 6.2 | 168 |
| | 11 | 0.2 | 0.5 | 74 | 1.9 | 6.4 | 150 |
| | 12 | 0.2 | 0.5 | 73 | 2.1 | 5.9 | 201 |
| Comparative Example | 1 | 0.2 | 0.5 | 89 | 2.5 | 3.3 | 187 |
| | 2 | 0.2 | 0.5 | 92 | 2.5 | 3.3 | 176 |
| | 3 | 0.2 | 0.5 | 80 | 2.3 | 6.3 | 116 |
| | 4 | 0.2 | 0.5 | 77 | 2.2 | 6.1 | 142 |
| | 5 | 0.2 | 0.5 | 70 | 2.0 | 9.2 | 137 |

TABLE 1-continued

| | | | | | | |
|---|---|---|---|---|---|---|
| 6 | 0.2 | 0.5 | 63 | 1.8 | 11.0 | 127 |
| 7 | 0.2 | 0.5 | 79 | 2.3 | 3.3 | 188 |
| 8 | 0.2 | 0.5 | 73 | 2.1 | 3.4 | 201 |
| 9 | 0.2 | 0.5 | 70 | 2.0 | 3.6 | 215 |

As shown in Table 1, the polybutylene terephthalate resin compositions in Examples 1 to 12 of the present invention with use of a polybutylene terephthalate resin having an intrinsic viscosity within a specific range, containing a modified olefin resin and a polyester elastomer at a specified blending ratio, achieved compatibility between high Charpy impact strength and high fluidity. Also, it can be confirmed that addition of the carbodiimide compound further improved the Charpy impact strength.

INDUSTRIAL APPLICABILITY

According to the present invention, a polybutylene terephthalate resin composition having excellent impact properties and high fluidity can be obtained, which can be suitably used for applications requiring precision molding, enabling weight reduction, improvement in the degree of freedom of shape, and easy production of a molding, which will greatly contribute to the industry.

The invention claimed is:

1. A polybutylene terephthalate resin composition comprising:

84 to 95 parts by mass of a polybutylene terephthalate resin (A) having an intrinsic viscosity (IV) of 0.60 to 0.95 dl/g, 3 to 9 parts by mass of a modified olefin resin (B), 1 to 13 parts by mass of a polyester elastomer (C), and 0.1 to 1.2 parts by mass of a carbodiimide compound (D), based on 100 parts by mass of components (A), (B) and (C) in total, wherein the polybutylene terephthalate resin composition has a flow length obtained by injection molding (measurement conditions: cylinder temperature at 250° C., mold temperature at 50° C., and an injection pressure at 80 MPa) of 155 mm or more.

2. The polybutylene terephthalate resin composition according to claim 1, wherein a molding obtained by injection molding of the polybutylene terephthalate resin composition has a Charpy impact strength of 4.5 kJ/m$^2$ or more.

3. The polybutylene terephthalate resin composition according to claim 1, wherein the modified olefin resin (B) is an ethylene copolymer obtained by copolymerization with maleic anhydride and/or glycidyl methacrylate, wherein a total amount of maleic anhydride and/or glycidyl methacrylate in the ethylene copolymer is 0.01 to 15 mass %.

* * * * *

UNITED STATES PATENT AND TRADEMARK OFFICE
CERTIFICATE OF CORRECTION

| | | |
|---|---|---|
| PATENT NO. | : 12,312,439 B2 | Page 1 of 1 |
| APPLICATION NO. | : 17/429753 | |
| DATED | : May 27, 2025 | |
| INVENTOR(S) | : Motonobu Kamiya, Yasuto Fujii and Takuya Shimoharai | |

It is certified that error appears in the above-identified patent and that said Letters Patent is hereby corrected as shown below:

On the Title Page

In item (73), please delete "TOYOBO CO., LTD.", and add --TOYOBO MC Corporation--.

Signed and Sealed this
Second Day of September, 2025

Coke Morgan Stewart
*Acting Director of the United States Patent and Trademark Office*